June 9, 1936. W. H. BAHLKE 2,043,646
PROCESS FOR THE CONVERSION OF ACID SLUDGE INTO
SULPHUR DIOXIDE, HYDROCARBONS, AND COKE
Filed June 30, 1932
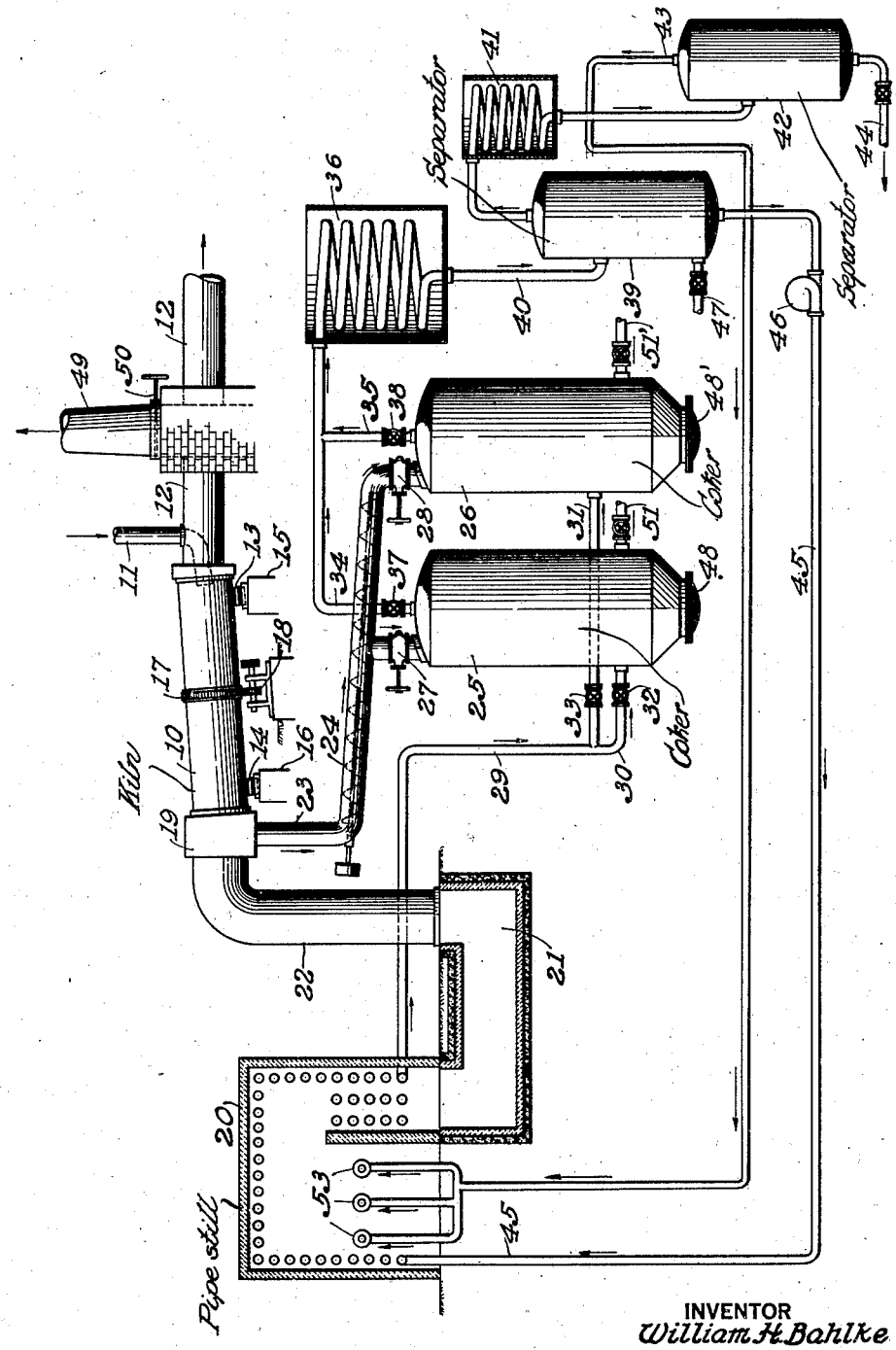
INVENTOR
William H. Bahlke
BY
Bruce K. Brown
ATTORNEY Patented June 9, 1936

2,043,646

UNITED STATES PATENT OFFICE 2,043,646

PROCESS FOR THE CONVERSION OF ACID SLUDGE INTO SULPHUR DIOXIDE, HYDROCARBONS, AND COKE

William Herbert Bahlke, Hammond, Ind., assignor to Standard Oil Company, Chicago, Ill., a corporation of Indiana Application June 30, 1932, Serial No. 620,222

5 Claims. (Cl. 202—16)

This invention relates to a process and apparatus for coking, and it pertains more particularly to a process and apparatus for coking acid sludge resulting from the refining of oils, such as mineral oils and the like.

In the refining of oils such as mineral lubricating oils, refined or white mineral oils and naphthas, the oil is commonly treated with sulphuric acid and, as a result of this treatment, the asphalt and asphalt-like materials and other objectionable compounds are removed. The acid sludge separates from the oil as a viscous or semi-solid to solid material, and if desired, this sludge may be hydrolyzed. All of the sludge materials are generically referred to as acid sludge. The chemical constitution of acid sludge is obscure, but it does contain, among other things, the major portion of the sulphur-bearing compounds that were in the oil. Also, it contains compounds formed by the reaction of sulphuric acid and certain hydrocarbons of the oil. Because of the high content of acid, it is of almost no value as a fuel, and efforts to separate the acid from the combustible materials leads to troublesome emulsions, thereby making the acid sludge a difficult product to dispose of.

The principal object of my invention is to provide a new and satisfactory process for disposing of acid sludge and at the same time converting it into commercially valuable products.

Another object of my invention is to provide a process for preparing substantially sulphur-free coke from acid sludge.

A further object of my invention is to provide a process and means for coking acid sludge wherein the sulphur and a major portion of the volatile materials are removed in different stages of the process.

The drawing shows an elevational view, partly in section, of the apparatus for coking the sludge and removing the sulphur dioxide and volatile materials in different stages of the process.

Briefly, the acid sludge is subjected to a controlled heating operation by passing it through a rotary kiln, or suitable heating-means, wherein the sludge is contacted countercurrently with hot gases, thereby removing the water and a major part of the sulphur (as sulphur dioxide) without producing hydrocarbon liquids or fixed hydrocarbon gases therefrom. The sludge is converted to a semi-coke in this operation, which, however, still has too high a sulphur content to be useful as a fuel, and this product is then passed into a coking chamber where it is coked in contact with hot hydrocarbon vapors which are at a considerably higher temperature than the gases used in the first stage of the process. The volatile hydrocarbon constituents and most of the sulphur compounds remaining in the semi-coke are removed during the final coking operation, and are then condensed. The gases containing sulphur dioxide recovered from the initial heating treatment may be used in the manufacture of sulphuric acid or other chemicals. The sulphur dioxide recovered from this initial heating treatment is particularly adapted for use in the catalytic manufacture of sulphuric acid, such as by the contact process or lead chamber process, because the sulphur dioxide and gases are substantially free from hydrocarbons or volatile organic materials derived from the acid sludge. Hydrocarbons and volatile organic materials would be very injurious to the catalytic masses used in the preparation of sulphuric acid by the contact process, and the combustion of these organic compounds would reduce the rate of conversion. By my process these catalyst poisons are not removed until in the final coking stage and do not contaminate the sulphur dioxide gases.

The apparatus for coking the acid sludge comprises an inclined rotary kiln 10 provided with a sludge-feed conduit 11 and a gas outlet 12. The kiln is mounted on the rollers 13 and 14, which are supported by the foundations 15 and 16 respectively. The kiln is rotated in the conventional manner by the aid of the ring gear 17 and pinion 18. The lower part, or outlet, of the kiln terminates in the box 19.

The hot combustion gases from the pipe still 20 pass through the flue 21 and pipe 22, and enter the lower part of the kiln through the box 19. The temperature of the flue gases varies to some extent, but they should contain sufficient heat to maintain the acid sludge in the kiln at a final temperature within the range of 400 to 525° F. The semi-coke which is produced is discharged from the box 19 through line 23 to the screw conveyor 24. The conveyor moves the material into one of the coking drums 25 or 26, the entrances to which are controlled by gate valves 27 and 28 respectively. Hot oil vapors from the pipe still 20, for finally coking the sludge, are delivered to the cokers 25 and 26 by the conduit 29, and the vapors are then introduced into the cokers by lines 30 and 31 controlled by valves 32 and 33 respectively. Generally, the temperature of the oil vapors is from 800 to 1100° F., but preferably within the range of about 950 to 1000° F. The oil used is preferably a light gas oil or kerosene with a gravity within the range of 35 to 45° A. P. I.

However, the process is not limited to the use of the particular oils herein defined, but other suitable hydrocarbons and compounds may be used, such as naphtha bottoms, diphenyl, diphenyl ether and the like.

The hot oil vapors and the volatile materials removed from the coke pass from the top of the cokers 25 and 26 by the lines 34 and 35 respectively, to the condenser 36. Valves 37 and 38 direct the flow of overhead materials from the respective cokers. The condensate from the partial condenser 36 passes to the separator 39 by the line 40, where uncondensed materials are separated and passed to the second condenser 41 and then into the separator 42 where the light condensates are removed through line 44. This fraction of condensed material will consist of light hydrocarbons such as gasoline and naphtha. Uncondensed gases are discharged through line 43. The heavier condensibles that collect in the separator 39 are recycled through line 45 to pipe still 20 by the aid of pump 46. Additional liquid heating medium may be added to the system through line 47 when needed, or as an excess accumulates, it may be removed through this line in order to keep a relatively constant amount of heating liquid in the system. Also, line 47 may be used to remove water from the separator. When continuous operation is used with my process, one of the cokers is cut out of the process and cleaned while the other coker is being used. The coke is removed from the respective cokers by removing the headers 48 and 48'. The cokers may be of any suitable design such as the conical bottom type shown and they will preferably be lagged in order to conserve heat and maintain the proper coking temperatures therein.

To practice my invention, the acid sludge is introduced into the kiln 10 through the said pipe 11, and the hot flue gases from the pipe still 20 are introduced into the lower part of the kiln and passed countercurrently to the flow of sludge. The hot flue gases and the sulphur dioxide removed from the sludge pass through the conduit 12 and may be disposed of as herein explained, or they may be discharged by the damper 50 through stack 49 to the air. The gases leaving the kiln are prevented from escaping through the feed-pipe 11 by continuously introducing sludge into said pipe. The temperature of the gases introduced into the kiln from the pipe still are usually within the range of 500 to 1000° F. and the rate of contact with the sludge is adjusted so that the sludge will be heated to a temperature within the range of 400 to 525° F., preferably 450° F. At this temperature, a substantial amount of the sulphur is removed from the acid sludge, but the hydrocarbon content of the gases leaving the kiln is negligible. If desired, the small amount of hydrocarbons removed with the sulphur dioxide may be eliminated by condensation or absorption since they are not of the fixed gas type. Also the water removed from the sludge may be separated from the sulphur dioxide by condensation.

As pointed out above, all types of acid sludge may be used in my process, and if the sludge is of the semi-solid type it may tend to stick to the sides of the kiln. This may be prevented by mixing the semi-solid or sticky sludge with dry coke or other dry materials, thereby causing the acid sludge to ball up and pass through the kiln without sticking to the sides.

The semi-coke discharged from the kiln is generally of a granular or powdery form, and its sulphur content has usually been reduced to the order of about 7 to 9%. However, the volatile material content of this coke is very high, ranging from 55 to 70%.

The heated sludge which has been deprived of a large portion of its sulphur, in the form of $SO_2$, is now introduced into the coker 25 where it is contacted with hot oil vapors from the pipe still 20. The heated sludge and oil vapors may be introduced into the coker simultaneously, and the worm conveyor serves as a seal to prevent volatile materials from passing back into the kiln. Little difficulty is encountered with vapors escaping from the coker because of the low pressure carried therein, which may be from 2 to 40 pounds per square inch above atmospheric, but ordinarily about 5 to 10 pounds per square inch above atmospheric. After the coker 25 has been filled, the gate valve 27 is closed and the coking may be continued until substantially all of the sulphur and volatile materials have been stripped or removed from the coked sludge. The valve 32 is then closed and the coker 25 allowed to soak and cool. To hasten the cooling of the coke, water may be introduced into the lower part of the cokers by the lines 51 and 51', thereby causing steam to pass up through the mass of coke. Also, this treatment with water and steam tends to loosen the coke from the side of the coker and aid in its removal therefrom. After the contents of the coker have been partly cooled, the coke is removed through the bottom. Any suitable means may be used to remove the coke from the cokers, such as by picking, by the use of explosives or by means of cables suspended in the coke.

When coker 25 has been filled and the gate valve 27 closed, the gate valve 28 on coker 26 is opened and the coker is filled and operated as described above in connection with coker 25. After coker 26 has been filled, valve 28 is closed and then coker 25 is recharged and the cycle repeated. If desired, three or four cokers may be used instead of two as illustrated. The capacity desired will usually determine the number of cokers to be used.

Instead of introducing the heated semi-coke sludge and oil vapors into the cokers simultaneously, the cokers may be partly filled or filled with heated semi-coke before the hot oil vapors are introduced therein. However, before the acid sludge can be successfully coked in the cokers, it is necessary to apply a preliminary heat treatment in order to remove the water from the sludge, thereby eliminating foaming.

The temperature of the oil vapors used in the cokers 25 and 26 may vary in accordance with the degree of coking desired, but generally the temperature of the oil used will range from 800 to 1100° F. and the temperature at which the coking is effected may vary from 750 to 1000° F. However, the preferred temperature for coking is from 800 to 900° F. The higher the temperature used for coking the shorter will be the time required. The pressure within the cokers may vary during the coking operation, generally from 4 to 8 pounds per square inch above atmospheric at the start to 6 to 20 pounds at the end of the coking operation. However, the pressure should always be regulated so that oil from the pipe still can pass through the cokers to the condenser 36 in sufficient volume to give adequate coke. The capacity of the apparatus may be varied at will by merely controlling the rate at which sludge is introduced through line 11 and the fuel supplied to heater 20. A lower rate of operation requires less fuel in the kiln 10 to obtain the proper degree of coking and at the same time less heat is needed for the final coking step, so that the rate of circulation of the heating medium by pump 46 may be reduced.

The vapors and volatile materials removed from the cokers 25 and 26 pass into the condenser 36 and then to the separator 39 where the low boiling fraction of hydrocarbons are separated from the high boiling fraction of hydrocarbons. The major part of the low boiling materials comprises the normally gaseous hydrocarbons and hydrocarbons that boil within the gasoline range. A conventional fractionating tower may be used in place of the partial condenser 36 and separator 39, if desired. After the volatile materials have passed through the second condenser 41, the hydrocarbons boiling within gasoline range are condensed and removed through the line 44. Also, a substantial portion of the water and condensed steam from the cokers is removed through line 44. A substantial proportion of the sulphur compounds removed from the coke is retained in the gasoline and oil recovered from the separator 42. Also, the gaseous hydrocarbons removed through line 43 contain part of the sulphur compounds removed from the coke, mostly in the form of hydrogen sulphide. However, the amount of corrosive sulphur compounds in the volatile materials from the cokers is very small, as a result of the preliminary step of semi-coking, thereby materially reducing the amount of corrosion in the condensers and separators.

The sulphur-bearing gases and oils obtained from separator 42 may be returned to the pipe still and burned in the burners 53, thereby providing fuel for heating the oil in the pipe still and, at the same time, enriching the sulphur dioxide content of the gases that pass from the pipe still to the kiln 10. By this method of operation, substantially all of the sulphur in the acid sludge is converted into sulphur dioxide which is substantially uncontaminated with hydrocarbons or catalyst poisons. The oil recovered in the separator 39 is recycled to the pipe still 20 and again used for the coking operation.

By the combination of the steps of preheating the sludge to remove sulphur dioxide and water, and then completing the coking in contact with hot oil vapors, I can prepare coke from acid sludge that may be satisfactorily burned for commercial use. Also, the herein described combination provides a means for recovering substantially all of the sulphur in the acid sludge as $SO_2$ without it being contaminated with volatile materials that are formed during the final coking of the sludge. The sulphur dioxide gas recovered by this process is substantially free from hydrocarbons and can be successfully used to manufacture sulphuric acid by a catalytic process employing vanadium oxide, platinum and other catalysts, without further substantial purification. Also, if the gas and oil recovered in the separator 42 are burned in the pipe still 20, all the sulphur in the acid sludge, save about 1% which remains in the coke, will be converted into sulphur dioxide for use in the manufacture of sulphuric acid and other chemicals. If the whole process of coking were performed in the kiln or cokers, the mixture of sulphur dioxide and volatile hydrocarbon recovered therefrom could not be used for the manufacture of acid on account of the presence of large quantities of hydrocarbons which serve as catalyst poisons.

As a result of the combination of coking the acid sludge in two stages, the volatile materials passing from the cokers contain a relatively small amount of corrosive materials, whereas, if the coking had been performed in the cokers, the condensers, separators, and other equipment employed in handling the overhead materials would be severely corroded by the corrosive materials such as sulphur dioxide.

Heretofore, attempts have been made to coke acid sludge in one operation, such as by heating it in coking drums similar to cokers 25 and 26, but considerable operating troubles are encountered as a result of foaming and puking. By my process, however, the preliminary step of heating the sludge removes substantially all of the water therein and thereby avoids foaming, and similar objectionable operating troubles.

While my invention has been described with reference to specific examples, it must be understood that the invention is not intended to be limited thereto, except by the terms of the appended claims.

I claim:
1. A process for the conversion of acid sludge into sulphur dioxide, hydrocarbons and coke, comprising heating the acid sludge to a non-coking temperature to distill off sulphur dioxide without distilling off the bulk of the hydrocarbons present, separating the distillate from the residue, separately heating said residue in the absence of said distillate by direct contact with hot hydrocarbon material to a coking temperature substantially higher than said non-coking temperature to distill off hydrocarbons, and separately recovering said hydrocarbons.

2. A process for the conversion of acid sludge into sulphur dioxide, hydrocarbons and coke, comprising heating the acid sludge to a temperature within the approximate range 400° F. to 525° F. to distill off sulphur dioxide without distilling off the bulk of the hydrocarbons present, separating the distillate from the residue, separately heating said residue in the absence of said distillate by direct contact with hot hydrocarbon vapors to a temperature within the approximate range 800° F. to 1000° F. to distill off hydrocarbons and coke the residue, and separately recovering said hydrocarbons.

3. A process for the conversion of acid sludge into sulphur dioxide, hydrocarbons and coke comprising heating the acid sludge to a non-coking temperature to distill off sulphur dioxide without distilling off an appreciable amount of hydrocarbons, separating the distillate from the residue, separately heating said residue in the absence of said distillate by direct contact with a hot hydrocarbon material to a coking temperature substantially higher than said non-coking temperature to distill off hydrocarbons and coke the residue, fractionating said hydrocarbons into a low sulphur fraction and a high sulphur fraction, heating at least a substantial portion of said high sulphur fraction and recycling the heated material to serve as at least a portion of the aforementioned hot hydrocarbon material.

4. A process for the conversion of acid sludge into products consisting substantially of sulphur dioxide, hydrocarbons boiling predominantly within the gasoline range, and coke, comprising heating the acid sludge by direct contact with hot sulphur-dioxide-containing gas to distill off an additional quantity of sulphur dioxide from said acid sludge without coking said acid sludge, separating the distillate from the residue, separately heating said residue in the absence of said distillate by direct contact with hot hydrocarbon material to a coking temperature substantially higher than said non-coking temperature to distill off volatile materials and leave a coke residue, condensing and fractionating said volatile constituents into three fractions consisting substantially of a gas containing hydrogen sulphide, hydrocarbons boiling predominantly within the gasoline range and a heavy hydrocarbon material respectively, heating and recycling said gas containing hydrogen sulphide to serve as at least a portion of the hot gas used for the initial heating of the acid sludge and heating and recycling the heavy hydrocarbon material to serve as the hot hydrocarbon material used for the final coking of the acid sludge.

5. A process for the conversion of acid sludge into products consisting substantially of sulphur dioxide, hydrocarbons boiling predominantly within the gasoline range, and coke, comprising heating the acid sludge under gradually increasing temperatures by direct contact with hot sulphur-dioxide-containing gas to distill off an additional quantity of sulphur dioxide from said acid sludge, separating the distillate from the residue, separately heating said residue in the absence of said distillate by direct contact with hot hydrocarbon oil to a coking temperature to distill off volatile materials and leave a coke residue, condensing and fractionating said volatile materials into three fractions consisting of a gas containing combustible sulphur compounds, hydrocarbons boiling predominantly within the gasoline range, and a heavy hydrocarbon material respectively, heating and recycling said gas containing combustible sulphur compounds to serve as at least a portion of the hot gases used for the initial heating of the acid sludge and heating and recycling the heavy hydrocarbon material to serve as the hot hydrocarbon oil used for the final coking of the acid sludge.

WILLIAM HERBERT BAHLKE.